though chloromethylation of toluene with paraformaldehyde and hydrogen chloride in the presence of these materials is known.

3,294,850
HALOALKYLATION PROCESS

George W. Ayers, Chicago, and William A. Krewer, Arlington Heights, Ill., assignors, by mesne assignments, to Union Oil Company of California, Los Angeles, Calif., a corporation of California
No Drawing. Filed Nov. 8, 1963, Ser. No. 322,528
16 Claims. (Cl. 260—651)

This invention relates to a process for the haloalkylation of organic compounds and more particularly to the finding that when toluene is chloromethylated by formaldehyde or a formaldehyde polymer and hydrogen chloride at a temperature of about 40° to 100° C. and atmospheric pressure, in the presence of a catalytic amount of phosphorus pentoxide and/or a mixture of oxygen acids of pentavalent phosphorus containing at least 84% by weight total phosphorus calculated as $P_2O_5$, the product is almost exclusively the para isomer.

Also this invention relates to a process for the chloromethylation of toluene by formaldehyde or a formaldehyde polymer and phosphorus oxychloride in the presence of phosphorus pentoxide and/or a mixture of oxygen acids of pentavalent phosphorus containing at least 84% by weight total phosphorus calculated as $P_2O_5$, to produce higher yields of para-chloromethyltoluene and decreased yields of the less desirable ditolylmethane and higher boiling by-products.

The replacement of a hydrogen atom in an organic compound by a chloromethyl group in a single operation has come to be known as chloromethylation. The process is best illustrated by the classic example of the reaction of benzene, hydrogen chloride, paraformaldehyde and zinc chloride. The chloromethylation reaction, or broadly the haloalkylation reaction, is of value in synthetic work because the halomethyl groups can be converted into other groups such as the hydroxymethyl group, the aldehyde group, the cyanomethyl group and the methyl group itself. The reaction is generally applicable to aromatic hydrocarbons such as benzene, naphthalene, anthracene, phenanthrene, biphenyl and many of their derivatives. Terphenyl is classically resistant to the chloromethylation reaction and the presence of a halogen atom, a nitro group or a keto group in the organic compound to be chloromethylated interferes with the reaction.

The procedure for haloalkylation or chloromethylation is quite simple. The formaldehyde is readily generated in the reaction mixture by depolymerization of paraformaldehyde (trioxymethylene). The terms paraformaldehyde and trioxymethylene are used interchangeably in the literature and refer to the polyoxymethylenes, that is, polymers having the structure $HOCH_2O(CH_2O)_nCH_2OH$. The trimer $(CH_2O)_3$ having a melting point of 62° to 63° C. is called alpha-trioxymethylene or s-trioxane. It is anhydrous whereas paraformaldehyde generally contains from 2 to about 5 percent of moisture. Formalin, which is an aqueous solution of formaldehyde, can be used as the source of formaldehyde in some haloalkylation or chloromethylation procedures, but such procedures are not applicable to the process of the instant invention. Water beyond that quantity formed in the haloalkylation or chloromethylation reaction or in excess of the very small amount present in paraformaldehyde tends to modify the catalytic action of phosphorus pentoxide and/or the mixture of oxygen acids of pentavalent phosphorus containing at least 84% total phosphorus calculated as $P_2O_5$ and to cause the formation of excessive amounts of the unwanted diarylmethane or ditolylmethane and higher boiling condensation products even to the exclusion of any haloalkylarene or chloromethyltoluene whatever in the haloalkylation or chloromethylation product. When chloromethyl ether or dichloromethyl ether is used instead of formaldehyde, chloromethylation can usually be effected without the use of added hydrogen chloride.

Various catalysts are known in the art for promoting the haloalkylation or chloromethylation reaction. These include zinc chloride, sulfuric acid, and acetic acid. The inclusion of small amounts of aluminum chloride with the fused zinc chloride aids the reaction. In carrying out the reaction, various reactant mixtures are used, such as a mixture of paraformaldehyde and zinc chloride in the presence of hydrogen chloride; and a mixture of chloromethyl ether and carbon disulfide, with stannic chloride. Acetic acid, which is used in some haloalkylation or chloromethylation reactions, is to be avoided in the process of the instant invention, since it rapidly deactivates the catalyst used therein.

In accordance with this invention, it has been found that a specific effect is exerted on the haloalkylation or chloromethylation reaction by phosphorus pentoxide and/or a mixture of oxygen acids of pentavalent phosphorus containing at least 84% total phosphorus calculated as $P_2O_5$. In the haloalkylation or chloromethylation of a reactive mono-substituted ortho-para directing aromatic compound, including toluene, in the presence of phosphorus pentoxide and/or a mixture of oxygen acids of pentavalent phosphorus containing at least 84% total phosphorus calculated as $P_2O_5$, the entering haloalkyl or chloromethyl group is directed almost wholly to the position para to the group already present in the aromatic compound. This is very unique since every investigation of the products of chloromethylation of aromatic compounds such as toluene by previously known methods, except that involving the use of phosphorus oxychloride, has shown that a large amount of the ortho isomer is always formed along with the para isomer. Phosphorus oxychloride directs the chloromethyl group almost exclusively into the position para to the methyl group in toluene.

Phosphorus pentoxide and/or a mixture of oxygen acids of pentavalent phosphorus containing at least 84% total phosphorus calculated as $P_2O_5$, furthermore, can be used to enhance the effect of an acid chloride (including phosphorus oxychloride) in the haloalkylation or chloromethylation reaction, the result being a greatly enhanced yield of haloalkylated or chloromethylated product with a decrease in the relative amount of unwanted diarylmethane or diarylmethane and higher boiling condensation products.

It is also a feature of this invention that a very prominent specific catalytic action occurs when the chloromethylation reaction is carried out with a formaldehyde polymer and hydrogen chloride, in the presence of phosphorus pentoxide and/or a mixture of oxygen acids of pentavalent phosphorus containing at least 84% by weight of total phosphorus calculated as $P_2O_5$. The yield of unwanted ditolylmethane and higher boiling condensation by-products is much less than that obtained in chloromethylation with phosphorus oxychloride in the presence of hydrogen chloride, and the yield of the chloromethyl product is enhanced. The substance known commercially as metaphosphoric acid and composed of a large number of very high molecular weight polyphosphoric acids is a very effective and desirable catalyst for the chloromethylation of toluene with paraformaldehyde or s-trioxane and hydrogen chloride, while ortho-phosphoric acid and the commercial free-flowing polyphosphoric acid (a mixture of low molecular weight polyphosphoric acids) are essentially useless in the preparation of chloromethyltoluene from a formaldehyde polymer and hydrogen chloride.

In the chloromethylation of toluene, the toluene is reacted with formaldehyde or a formaldehyde polymer and hydrogen chloride in the presence of a catalyst to produce chloromethyltoluene:

(I)
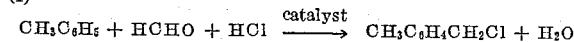

Phosphorus oxychloride also chloromethylates toluene, particularly in the presence of a catalyst such as hydrogen chloride:

(II)
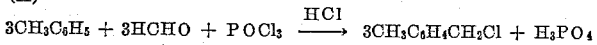

Reaction I produces at least about 30% of the ortho isomer when the known prior art catalysts are used. Reaction II produces a chloromethylated product (chloromethyltoluene) which contains approximately 98% of the para isomer. This reaction shows a remarkable selectivity for the formation of the para isomer. Appreciable amounts of undesirable by-products such as ditolylmethane and higher condensation products accompany the chloromethyltoluene in Reaction II.

The main reaction of the present invention is illustrated as follows:

(III)
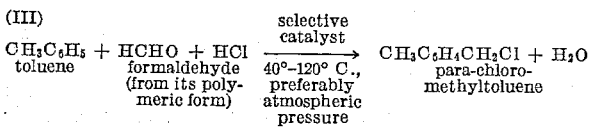

In Reaction III the chloromethyltoluene formed is almost exclusively the para isomer and it is formed in good yield. A by-product composed of ditolylmethane and higher boiling condensation products is also formed, the quantity depending upon the amount of mixed acids of phosphorus formed (from the catalyst) which have a total phosphorus content (as $P_2O_5$) of less than 84% by weight. The selective catalyst is the catalyst of this invention, namely, phosphorus pentoxide and/or a mixture of oxygen acids of pentavalent phosphorus containing at least 84% by weight of total phosphorus calculated as $P_2O_5$. The temperature of the reaction is preferably maintained at the lowest value (usually 90–95° C.) at which the reaction is rapid. Higher temperatures tend to promote the formation of ditolylmethane and higher boiling condensation products and are to be avoided if possible.

Another reaction of this invention is illustrated by the following equation:

(IV)
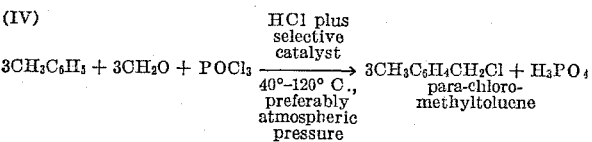

Here the selective catalyst, with the composition as given in the preceding paragraph, acts in conjunction with the hydrogen chloride and phosphorus oxychloride to bring about a larger yield of chloromethyltoluene and a smaller yield of undesired ditolylmethane and higher boiling condensation by-products than when the reaction takes place in the absence of the selective catalyst. The chloromethyltoluene formed in either case is almost wholly the para isomer. The same considerations for the temperature apply to Reaction IV as for Reaction III.

In carrying out either Reaction III or Reaction IV, either a batch or continuous operation may be employed. The reactants as well as the selective catalyst may be added in any order desired and also in any relative quantity necessary for effectively carrying out this invention. In Reaction III, one mole of hydrogen chloride is required for one mole of formaldehyde and any quantity of selectivity catalyst up to one mole per mole of formaldehyde can be used. About 0.4 mole of selective catalyst per mole of paraformaldehyde gives a good balance between desired catalytic action and the amount required to maintain the catalyst in the desired active form in the presence of the water given off during the reaction. Water combines with the selective catalyst at a rate less than that of chloromethylation to change the catalyst into one having high activity towards the formation of higher boiling condensation by-products. In Reaction III the water formed tends to convert the active phosphorus oxychloride into undesired material which catalyzes condensation and the formation of higher boiling products. The use of selective catalyst results in less deterioration of the phosphorus oxychloride during the reaction and both act to give a high yield of chloromethyltoluene.

Accordingly it becomes a primary object of this invention to provide a process for the production of haloalkylated organic compounds by conducting the classical haloalkylation reaction (except where water or an aqueous solution is used as a solvent or reactant) in the presence of phosphorus pentoxide and/or a mixture of oxygen acids of pentavalent phosphorus containing at least 84% by weight of total phosphorus calculated as $P_2O_5$.

Another object of this invention is to provide a more selective catalyst for the chloromethylation of toluene to produce primarily para-chloromethyltoluene, which is oxidizable to terephthalic acid.

Another object of this invention is to provide a process wherein toluene is chloromethylated by formaldehyde or a formaldehyde polymer and hydrogen chloride in the presence of a catalytic amount of phosphorus pentoxide and/or a mixture of oxygen acids of pentavalent phosphorus containing at least 84% by weight of total phosphorus calculated as $P_2O_5$, at a temperature of about 40° to 120° C. and essentially atmospheric pressure to produce almost exclusively the para isomer.

Another object of this invention is to provide a process for the chloromethylation of aromatic compounds using phosphorus oxychloride and catalytic amounts of phosphorus pentoxide and/or a mixture of oxygen acids of pentavalent phosphorus containing at least 84% by weight of total phosphorus calculated at $P_2O_5$, to produce higher yields of parachloromethyl products and decreased yields of undesirable ditolylalkanes and higher boiling by-products.

These and other objects of the invention will be described or become apparent as the specification proceeds.

The spent acids of pentavalent phosphorus separated mechanically or by washing the reaction product with water may be regenerated by concentrating them with heat to approximately 400° C. The resulting metaphosphoric acid (a mixture of very high molecular weight polyphosphoric acids) contains more than 84% total phosphorus calculated as $P_2O_5$ and is suitable for use as the selective catalyst of this invention. The selective catalyst may be used and regenerated repeatedly as many times as desired. The regenerated catalyst may be mixed with any proportion of fresh catalyst for use in the halomethylation or chloromethylation process of this invention.

The catalyst of this invention, called the selective catalyst or phosphorus pentoxide and/or a mixture of oxygen acids of pentavalent phosphorus, comprises any material in the $P_2O_5$-water system which has a total phosphorus content of at least 84% by weight, calculated as $P_2O_5$, regardless of its method of preparation. Water may be added to phosphorus pentoxide or phosphoric acid may be concentrated by heating to at least 400° C. to produce, for example, a mixture of oxygen acids of pentavalent phosphorus having a total phosphorus content of at least 84% by weight, calculated as $P_2O_5$. It will be of interest to review at this point the nature of the various phosphoric acids as elucidated by John R. Van Wazer in volume 1, chapters 9, 10 and 12, of his two-volume treatise called "Phosphorus and Its Compounds," published in 1958 by Interscience Publishers, Inc., New York, New York. The old, often-published list of phosphoric acids (orthophosphoric acid $H_3PO_4$, pyrophosphoric acid $H_4P_2O_7$ and metaphosphoric acid $HPO_3$) must be revised in the light of modern research. Only orthophosphoric acid and pyrophosphoric have been obtained in the pure state, in crystalline form. The so-called metaphosphoric acid is a mixture of a large number of isomers, most of which are of very high molecular weight. Many phosphates are known, some of them salts of intermediate phosphoric acids which have never been separated in the pure form. The phosphoric acids may be viewed as components of the $P_2O_5$–$H_2O$ system. Paper chromatography indicates that there is a very large number of phosphoric acids, most of which are polymeric. Wazer, in his table on page 748 of the aforementioned volume, shows the acid distribution in various "phosphoric acids" having a total phosphorus content from 69.0% to 86.6% by weight, calculated as $P_2O_5$. He commented that these "phosphoric acids" have the same acid distribution for each total phosphorus content, regardless of their method of preparation. Orthophosphoric acid, with a $P_2O_5$:$H_2O$ mole ratio of 1:3, in reality contains approximately 90% orthophosphoric acid and 10% pyrophosphoric acid. The so-called "pyrophosphoric acid," with a $P_2O_5$:$H_2O$ mole ratio of 1:2, contains about 17.5% orthophosphoric acid, about 42.5% pyrophosphoric acid, about 22.5% tripolyphosphoric acid, about 10.8% tetrapolyphosphoric acid, about 4.6% pentapolyphosphoric acid, about 1.4% hexapolyphosphoric acid, about 0.2% heptapolyphosphoric acid and probably a trace amount of octapolyphosphoric acid. "Metaphosphoric acid," with a $P_2O_5$:$H_2O$ mole ratio of 1:1 is a glassy solid which is composed of a very large number of polyphosphoric acids, most of which are of very high molecular weight. According to Wazer's aforementioned table, the quantity of very high molecular weight polyphosphoric acids begins to be appreciable in an "acid" containing approximately 84% total phosphorus calculated as $P_2O_5$.

We have found that phosphorus pentoxide, the very high molecular weight polyphosphoric acids, and mixtures thereof are excellent selective catalysts for haloalkylation and chloromethylation according to the present invention. Thus any composition of matter in the $P_2O_5$–$H_2O$ system, from straight $P_2O_5$ to a mixture of the oxygen acids of pentavalent phosphorus containing 84% by weight of total phosphorus, calculated as $P_2O_5$, is the selective catalyst of the present invention. The lower polyphosphoric aicds, for example those of degree of polymerization up to approximately 9 or 10, are not suitable as the selective catalysts of this invention because they strongly catalyze the formation of diarylalkanes and ditolylmethane and higher boiling condensation by-products even to the exclusion of haloalkyl compounds or chloromethyltoluene. Orthophosphoric acid also strongly catalyzes the formation of higher molecular weight products rather than chloromethyltoluene.

Phosphorus pentoxide, the so-called metaphosphoric acid and high $P_2O_5$-content polyphosphoric acid are commercially available as catalysts for this invention. "Metaphosphoric acid" is also available as a solid containing an appreciable amount of sodium metaphosphate as a preservative. "Metaphosphoric acid," obtained from Baker and Adamson and containing 34.0–36.0% metaphosphoric acid with 58.0–62.0% sodium metaphosphate as preservative, is an excellent selective catalyst for the haloalkylation or chloromethylation process of this invention.

Although the process of this invention is applicable mainly to the chloromethylation of toluene, it is also applicable to (1) the chloromethylation of many other aromatic substances; (2) the bromoethylation, iodomethylation and fluoromethylation of aromatic substances; and (3) the general haloalkylation of aromatic substances. With mono-alkyl aromatic hydrocarbons, our chloromethylation process yields almost entirely para-chloromethylation products. With polyalkyl aromatic hydrocarbons, the entering chloromethyl group takes the para position to alkyl groups wherever possible. Bromomethylation, iodomethylation and fluoromethylation are carried out, using hydrogen bromide, hydrogen iodide and hydrogen fluoride, respectively, instead of the hydrogen chloride used in chloromethylation. Haloalkylation of aromatic compounds may also be carried out using the respective hydrogen halide and paraldehyde (for haloethylation), propionaldehyde (for halopropylation), and butyraldehyde (for halobutylation).

In order to demonstrate the invention, a number of experiments were carried out wherein various amounts of metaphosphoric acid, phosphorus pentoxide, polyphosphoric acid, orthophosphoric acid, phosphorus oxychloride, paraformaldehyde, s-trioxane, and toluene were reacted at substantially the same temperatures and the individual runs were evaluated to determine the amount of chloromethyltoluene, ditolylmethane, higher boiling products and the ratio of para-chloromethyltoluene to ortho-chloromethyltoluene was determined. The results of these experiments are reported in Table I. Details of Runs 1, 4, 12 and 13 listed in Table I are given as Examples 1, 2 and 3.

TABLE I.—CHLOROMETHYLATION OF TOLUENE

| Run No. | Gram Moles of Reactants and Catalysts [1] | | | | | | | |
|---|---|---|---|---|---|---|---|---|
| | Toluene | Paraformaldehyde [1] $(CH_2O)_n$ | s-Trioxane | $P_2O_5$ | $HPO_3$ | Polyphosphoric Acid (82% $P_2O_5$) | 85% Sirupy Orthophosphoric Acid | $POCl_3$ |
| 1 | 0.9 | 0.9 | | 0.1 | | | | |
| 2 | 0.9 | 0.9 | | | 0.2 | | | |
| 3 | 0.9 | 0.9 | | | 0.2 | | | |
| 4 | 0.9 | 0.9 | | | 0.4 | | | |
| 5 | 0.9 | 0.9 | | | 0.6 | | | |
| 6 | 0.9 | 0.9 | | | [2] 0.24 | | | |
| 7 | 0.9 | 0.9 | | | [2] 0.25 | | | |
| 8 | 0.9 | 0.9 | | | [2] 0.6 | | | |
| 9 | 0.9 | | 0.33 | | 0.2 | | | |
| 10 | 0.9 | 0.9 | | | | 88 g. | | |
| 11 | 0.9 | 0.9 | | | | | 0.2 | |
| 12 | 0.9 | 0.9 | | | | | | 0.3 |
| 13 | 0.9 | 0.9 | | | 0.019 | | | 0.3 |

[1] A stream of hydrogen chloride gas was passed continuously through the reaction mixture during each of the runs; gram moles of $(CH_2O)_n$ are based on the monomer.
[2] A separate batch of $HPO_3$ was prepared for each run by heating 85% orthophosphoric acid to 400° C. The metaphosphoric acid used in other runs was that of Baker and Adamson containing 34.0–36.0% $HPO_3$ and 58.0–62.0% sodium metaphosphate as preservative.

TABLE I—Continued

| Run No. | Total Reaction Time (min.) | Reaction Temp. (° C.) | Products | | | |
|---|---|---|---|---|---|---|
| | | | Chloro-methyl-toluene (g.) | Ditolyl-methane (g.) | Higher Boiling Products (g.) | Para:Ortho Ratio for the Chloro-methylation |
| 1 | 40 | 34–85 | 10.3 | 11.3 | 15.0 | 49 |
| 2 | 50 | 40–93 | 11.9 | 3.2 | | |
| 3 | 80 | 40–95 | 21.2 | 5.3 | 3.2 | 32 |
| 4 | 80 | 40–95 | 31.1 | 18.6 | 8.5 | 32 |
| 5 | 75 | 40–96 | 16.4 | 8.3 | 6.0 | |
| 6 | 65 | 58–90 | 22.0 | 0 | 2.4 | 49 |
| 7 | 45 | 40–86 | 15.7 | 7.8 | 7.5 | 5 |
| 8 | 45 | 60–96 | 12.5 | 23.2 | 33.3 | 5 |
| 9 | 100 | 26–94 | 23.3 | 5.0 | 5.0 | 99 |
| 10 | 52 | 40–110 | 0 | 0 | 30.1 | |
| 11 | 40 | 50–82 | 0 | 0 | 12.2 | |
| 12 | 60 | 77–90 | 27.2 | 22.0 | 10.4 | 49 |
| 13 | 60 | 60–94 | 38.0 | 19.8 | 13.9 | 19 |

EXAMPLE I

*Chloromethylation of toluene with paraformaldehyde and hydrogen chloride in the presence of metaphosphoric acid (Run 4, Table I)*

In a three-neck 500 cc. flask, fitted with a mechanical stirrer, a gas inlet tube, and a condenser, were placed 27 g. of paraformaldehyde, 82.8 g. of toluene, and 92 g. of Baker and Adamson metaphosphoric acid (containing 34.0–36.0% $HPO_3$ and 58.0–62.0% sodium metaphosphate as preservative). A current of hydrogen chloride was passed into the stirred mixture during the whole reaction period (80 minutes). A Glas-Col heater maintained the temperature at approximately 93° C. during the run. The liquid was then decanted from the solid, which was then washed with about 60 cc. of toluene and the washings added to the decanted liquid. The combined liquid was washed with saturated sodium bicarbonate solution, then with water, and finally dried over anhydrous calcium chloride. Upon fractional distillation it yielded 31.1 g. of chloromethyltoluene, 18.6 g. of ditolylmethane, and 8.5 g. of higher boiling products.

About 3.5 g. of the chloromethyltoluene was heated under reflux for 10 hours with 15 g. of potassium permanganate in 300 cc. of water and a few drops of 10% sodium hydroxide solution. The solution was then made strongly alkaline with sodium hydroxide solution and heated, then filtered. The residue was washed thoroughly with boiling water and the washing added to the filtrate. The filtrate was acidified with hydrochloric acid and the precipitated phthalic acids were filtered hot and washed with successive portions of boiling water to remove the orthophthalic acid from the essentially insoluble terephthalic acid. The filtrate and the hot water washings were concentrated to a small volume and cooled with ice to precipitate the orthophthalic acid. Terephthalic acid comprised 97% by weight of the phthalic acid product and orthophthalic acid comprised 3%. This gives para:ortho ratio of 32 for the phthalic acids, and it follows that this same value should be the ratio of para- to ortho-chloromethyltoluene in the chloromethylation product.

A similar run in which the metaphosphoric acid catalyst was omitted yielded no chloromethyltoluene, ditolylmethane, nor higher boiling condensation by-products. However, chloromethyltoluene is formed when formalin and toluene are reacted in a large excess of concentrated hydrochloric acid in the presence of a stream of gaseous hydrogen chloride; water apparently acts to catalyze the reaction. The para:ortho ratio of the chloromethyltoluene formed in the latter manner was 2.6.

EXAMPLE II

*Chloromethylation of toluene with paraformaldehyde and hydrogen chloride in the presence of phosphorus pentoxide (Run 1, Table I)*

This run was carried out in the same manner as Example I except that (1) the metaphosphoric acid was replaced by 14.2 g. of phosphorus pentoxide, (2) the reaction time was 40 minutes, and (3) the average temperature of the reaction mixture was approximately 80° C. Fractional distillation of the dried toluene layer yielded 10.3 g. of chloromethyltoluene, 11.4 g. of ditolylmethane, and 15.0 g. of higher boiling condensation products. Oxidation of a portion of the chloromethyltoluene by the method of Example I gave a phthalic acid mixture composed of 98% by weight of terephthalic acid and 2% of orthophthalic acid. The para:ortho ratio of the phthalic acids (and also of the chloromethyltoluene) was 49.

EXAMPLE III

*Chloromethylation of toluene with paraformaldehyde and phosphorus oxychloride in the presence of hydrogen chloride and metaphosphoric acid (Run 13, Table I)*

In a three-neck 500 cc. flask, fitted with a mechanical stirrer, a dropping funnel, a gas inlet tube, and a condenser, were placed 27 g. of paraformaldehyde, 82.8 g. of toluene, and 1.5 g. of Baker and Adamson metaphosphoric acid. A current of hydrogen chloride was passed into the stirred mixture while it was brought to 60° C. by means of a Glas-Col heater. The current of hydrogen chloride and the stirring of the mixture were continued while 45.9 g. of phosphorus oxychloride was added dropwise over a period of 50 minutes. During the addition of the phosphorus oxychloride the temperature of the reaction mixture was maintained at approximately 90° C. Stirring of the mixture and the stream of hydrogen chloride were continued for a further 10 minutes. The upper liquid layer was then decanted from the reaction mixture and the residue and flask washed with about 60 cc. of toluene. The combined upper liquid layer and the washings were then treated as in Example I. Upon fractional distillation, the dried liquid layer yielded 38.0 g. chloromethyltoluene, 19.8 g. of ditolylmethane, and 13.9 g. of higher boiling condensation products. When a portion of the chloromethyltoluene was oxidized as in Example I, the acid obtained was comprised of 95% terephthalic acid and 5% orthophthalic acid, indicating that the para:ortho ratio of the chloromethyltoluene produced in Run 13 was 19.

Run 12 was carried out in the same manner as Example III except that the metaphosphoric acid was omitted. The yield of chloromethyltoluene was 27.2 g., that of ditolylmethane 22.0 g., and that of higher boiling condensation products 10.4 g. A comparison of the results of Example III (Run 13) with Run 12 shows that the use of the small, catalytic amount of metaphosphoric acid in Run 13 resulted in a much higher yield of chloromethyltoluene, with a decreased proportion of ditolyl methane and higher boiling condensation products.

The results of Table I and Examples I to III illustrate some of the salient points in the process of the present invention. As brought out in the last paragraph of Example I, toluene does not react with paraformaldehyde and gaseous hydrogen chloride in the absence of a catalyst. Run 1 of Table I shows that phosphorus pentoxide is an effective catalyst for the chloromethylation of toluene with paraformaldehyde and gaseous hydrogen chloride, bringing about the formation of chloromethyltoluene composed of 98% by weight of the para isomer and 2% of the ortho isomer. Chloromethyltoluene prepared by a method representative of the previously known art contained 72% by weight of the para isomer and 28% of the ortho isomer. Thus phosphorus pentoxide is a selective catalyst for preparation of the para isomer. Runs 2–8 of Table I show that metaphosphoric acid (a mixture of very high molecular weight polyphosphoric acids), one sample prepared by concentrating ordinary 85% orthophosphoric acid to 400° C. and the other obtained from Baker and Adamson and containing 34.0–36.0% $HPO_3$ and 58.0–62.0% sodium metaphosphate as preservative, is a very effective catalyst for the chloromethylation of toluene with paraformaldehyde and hydrogen chloride.

Although it is not shown in Table I, the catalysts of Runs 7 and 8 had a lower total phosphorus content than that of Run 6, indicating the presence of a smaller amount of very high molecular weight polyphosphoric acids and more low molecular weight acids. The products of Runs 6 to 8, in agreement with effects expected from differences in catalyst composition, exhibit an increasing formation of ditolylmethane and higher boiling products with increase in content of lower molecular weight polyphosphoric acids in the catalysts used.

Runs 2 to 5 show that the commercial Baker and Adamson metaphosphoric acid is a very effective cataly stand indicate that the sodium metaphosphate content of the catalyst does not decrease the effectiveness of the catalyst. Run 10 of Table I illustrates the strong tendency of lower molecular weight polyphosphoric acids (as exemplified by an acid mixture containing only 82% total phosphorus calculated as $P_2O_5$) to bring about the formation of higher boiling by-products rather than chloromethyltoluene. Ordinary 85% orthophosphoric acid also catalyzes the formation of high boiling by-products rather than chloromethyltoluene. Thus the selective catalyst of the present invention is composed of phosphorus pentoxide, mixtures of the oxygen acids of pentavalent phosphorus containing at least 84% by weight of total phosphorus calculated at $P_2O_5$, and mixtures thereof.

The results of Runs 12 and 13 (Table I) and Example III show that metaphosphoric acid increases the yield of chloromethyltoluene and decreases the proportion of unwanted ditolylmethane and higher boiling by-products when it is present during the chloromethylation of toluene with phosphorus oxychloride and hydrogen chloride. The selective catalyst for this chloromethylation procedure is, again, broadly phosphorus pentoxide, mixtures of the oxygen acids of pentavalent phosphorus containing at least 84% by weight of total phosphorus calculated at $P_2O_5$, and mixtures thereof.

The embodiments of the invention in which an exclusive property or privilege is claimed are defined as follows.

1. The process for the haloalkylation of an alkyl aromatic hydrocarbon which comprises reacting said hydrocarbon with one of the groups consisting of lower alkanols and polymers thereof and a hydrogen halide in the presence of a catalyst selected from the group consisting of phosphorus pentoxide, and compositions in the $P_2O_5$–$H_2O$ system containing at least 84% by weight total phosphorus calculated as phosphorus pentoxide, at a temperature of about 40° to 120° C. and at atmospheric pressure.

2. The process for the preparation of para-chloromethyltoluene which comprises reacting toluene with a formaldehyde polymer and hydrogen chloride in the presence of a catalytic amount of a catalyst selected from the group consisting of phosphorus pentoxide, and compositions in the $P_2O_5$–$H_2O$ system containing at least 84% by weight total phosphorus calculated as phosphorus pentoxide, at a temperature of about 40° to 120° C. and at atmospheric pressure.

3. The process of producing para-chloromethyltoluene which comprises reacting toluene with a formaldehyde polymer and phosphorus oxychloride in the presence of hydrogen chloride and a catalytic amount of a catalyst selected from the group consisting of phosphorus pentoxide, and compositions in the $P_2O_5$–$H_2O$ system containing at least 84% by weight total phosphorus calculated as phosphorus pentoxide, at a temperature of about 40° to 120° C. and at atmospheric pressure.

4. The process of claim 2 in which said catalyst is metaphosphoric acid.

5. The process of claim 2 in which said catalyst is metaphosphoric acid stabilized by sodium metaphosphate.

6. The process of claim 2 in which the formaldehyde polymer is paraformaldehyde.

7. The process of claim 2 in which the formaldehyde polymer is s-trioxane.

8. The process of claim 3 in which said catalyst is metaphosphoric acid.

9. The process of claim 3 in which said catalyst is metaphosphoric acid stabilized by sodium metaphosphate.

10. The process of claim 3 in which the formaldehyde polymer is paraformaldehyde.

11. The process of claim 3 in which the formaldehyde polymer is s-trioxane.

12. The process of claim 2 in which said catalyst is formed by concentrating orthophosphoric acid by heating to at least 400° C. in an open vessel.

13. The process of claim 3 in which said catalyst is formed by concentrating orthophosphoric acid by heating to at least 400° C. in an open vessel.

14. The process for the catalytic preparation of para-chloromethyltoluene and the regeneration of the catalyst therefrom, which comprises, first, reacting toluene with a formaldehyde polymer and hydrogen chloride in the presence of a catalytic amount of a material selected from the group consisting of phosphorus pentoxide, and compositions in the $P_2O_5$–$H_2O$ system containing at least 84% by weight total phosphorus calculated as phosphorus pentoxide, second, separating the spent catalyst from the crude chloromethylation product, and third, concentrating by heating the spent catalyst to at least 400° C. in an open vessel.

15. The process for the catalytic preparation of para-chloromethyltoluene and the regeneration of the catalyst therefrom, which comprises, first, reacting toluene with a formaldehyde polymer and phosphorus oxychloride in the presence of hydrogen chloride and a catalytic amount of material selected from the group consisting of phosphorus pentoxide, and compositions in the $P_2O_5$–$H_2O$ system containing at least 84% by weight total phosphorus calculated as phosphorus pentoxide, second, separating the phosphorus-containing sludge from the crude chloromethylation product, and third, concentrating by heating the phosphorus-containing sludge to at least 400° C. in an open vessel.

16. The process of preparing para-chloromethyltoluene which comprises reacting one mole of toluene with about one mole of paraformaldehyde, calculated as the monomer, in the presence of at least one mole of hydrogen chloride and about 0.44 mole of metaphosphoric acid, calculated as $HPO_3$, at a temperature of about 58° to 95° C. and at about atmospheric pressure.

(References on following page)

References Cited by the Examiner

UNITED STATES PATENTS

| | | | |
|---|---|---|---|
| 2,304,537 | 12/1942 | Cambron | 260—651 |
| 2,862,980 | 12/1958 | Muench et al. | 260—651 |
| 3,069,480 | 12/1962 | Hirth et al. | 260—651 |
| 3,076,039 | 1/1963 | Ayers et al. | 260—651 |

OTHER REFERENCES

Rose et al.: Condensed Chemical Dictionary, (1961), pp. 888–9.

LEON ZITVER, *Primary Examiner.*

K. V. ROCKEY, *Assistant Examiner.*